Aug. 8, 1933.      E. S. CARPENTER      1,920,967

MECHANISM FOR DRIVING REELS

Filed July 9, 1930      2 Sheets-Sheet 2

Inventor
Ernest S. Carpenter
By Bates, Gobrick & Teare
Attorneys

Patented Aug. 8, 1933

1,920,967

UNITED STATES PATENT OFFICE 1,920,967

MECHANISM FOR DRIVING REELS

Ernest S. Carpenter, Cleveland Heights, Ohio, assignor to The Augustus-Carpenter Company, Cleveland, Ohio, a Corporation of Ohio Application July 9, 1930. Serial No. 466,684

21 Claims. (Cl. 242—55)

This invention relates to moving picture projectors and particularly to a mechanism for winding the film. A mechanism heretofore used for this purpose has embodied coiled wire belts, which have provided a driving connection for the supply and take-up reels respectively and has also utilized a ball-bearing clutch for allowing a slip connection to compensate for variations in peripheral speed, which would normally occur, as the number of turns increase on the take-up reel. The belt drive is objectionable for the belts require attention when the reel supporting arms are collapsed to permit insertion of the projector into the carrying case. Furthermore, the belts have a tendency to slip and thereby to drive unevenly and also to kink and break while the picture is being shown. The ball bearing clutches are objectionable for a certain amount of oil must be used to permit freedom of action, but it has been found that the presence of oil after a certain length of time causes the balls to stick in the tapered raceways, thereby interfering with the free running movement of the reel at the desired time.

An object of the present invention therefore, is to provide a simple and compact mechanism, which will eliminate the necessity for the use of belts, and which will still permit the reel supporting arms to be collapsed when the projector is placed within the container. An additional object is to provide a mechanism, which will permit variations in the speed of reel rotation to compensate for variations in the number of turns of film upon the reel and to eliminate the necessity for the use of ball clutches and thereby to minimize the necessity for servicing the mechanism after it has been placed in use.

Figure 2:
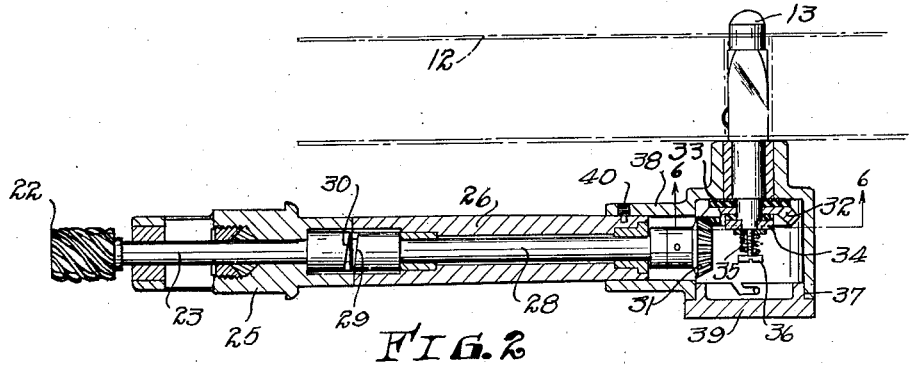
Figure 3:
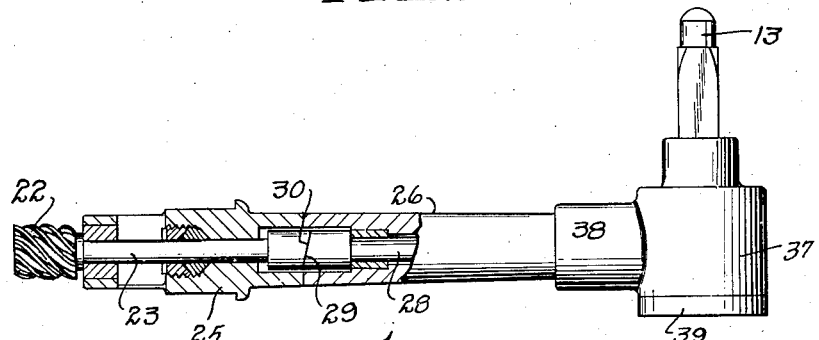
Figures 4, 6:
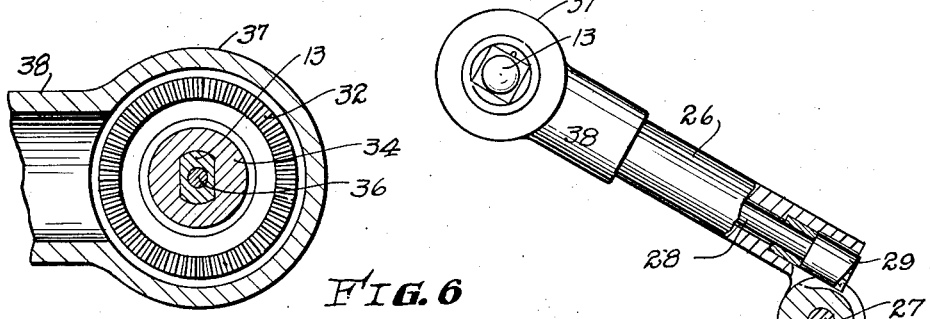
Figure 5:
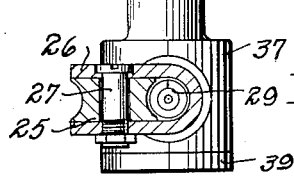

The preferred mechanism for carrying out my invention is illustrated in the drawings, wherein Fig. 1 is a side elevation of a projector embodying my invention; Fig. 2 is a section taken through the reel driving mechanism on a plane indicated by the line 2—2 in Fig. 1 and showing the mechanism in idle position; Fig. 3 is a view similar to that shown in Fig. 2 and illustrating the parts in driving position; Fig. 4 is an elevation partly in section and illustrating the separable connection of the driving mechanism; Fig. 5 is a section taken on the line 5—5 in Fig. 1; Fig. 6 is a section taken on the line 6—6 in Fig. 2, and Fig. 7 is a diagrammatical view illustrating the gearing mechanism for connecting the motor with the respective reels.

Referring now to Fig. 1, 10 indicates a base of a projector having a standard 11, which supports a projector mechanism. The present invention is particularly concerned with that part of the mechanism, which is adapted for operating the supply and take-up reels, so as to effect automatic operation of the reels in the proper direction in a simple and positive manner. To this end, I have indicated a supply reel 12 as being removably mounted upon a shaft 13, and I have indicated a take-up reel 14, as being similarly mounted on a shaft 15.

To effect rotation of the reel supporting shafts, I prefer to use an electric motor 20, which is mounted upon the base at the rear of the standard, and which is operatively connected by suitable gearing, including a worm wheel 21 and a worm 22 to a shaft 23. The worm wheel 21 is disposed within a housing 24, while the shaft 23 is journalled within the inner part 25 of a separable reel supporting arm. The outer part 26 of the arm is preferably pivotally connected to the part 25 at 27. A shaft 28 is journalled in the outer part of the arm and carries one part 29 of a spiral clutch. The coacting part 30 of the clutch is mounted on the shaft 23, and provision is made for sufficient movement of the shaft 23 with reference to the arm, to cause selective engagement of the clutch parts, and to permit disengagement at the desired time.

To connect the shaft 28 to the reel supporting shaft 13, I have shown a bevel gear 31, which is fixed to the shaft 28, and which meshes with a bevel gear 32 that is loosely mounted on the reel shaft 13. The gear 32 is disposed between washers 33 and 34, the first of which is rigidly mounted upon the shaft and the second of which is loosely mounted upon the shaft. A spring 35 is then utilized for frictionally clamping the gear to the washer, and the tension on the spring is arranged to be adjusted by a set screw 36. Access may be had to the screw for adjustment purposes through an opening 37 in a housing 38. Such opening is normally adapted to be closed by a cap 39, and the housing is adapted to be fastened onto the outerpart 26 of the arm by a securing member 40.

The worm and worm wheel connection at the inner end of each shaft 23 is such that rotation of the worm wheel causes rotation of the associated worm. Accordingly, if the wheel is rotated in one direction then initial movement of the wheel will tend to shift the worm and the associated shaft 23 axially until the shaft reaches its limit of axial movement. Rotation therefore, in one direction will move the shaft axially until the clutch teeth 29 and 30 are in engagement, while movement in the opposite direction will move the shaft until the teeth are out of engagement. Thus, the connection and disengagement occurs automatically depending upon the direction of rotation of the worm wheel. In addition, the arrangement of gearing within the housing is such that the clutch for the supply wheel is automatically disengaged when the clutch for the take-up reel is engaged, and vice-versa.

A diagrammatic illustration of the gearing arrangement to effect such result is shown in Fig. 7, wherein a shaft 40, which is directly geared to the motor, has spiral gears 41 and 42 rigidly mounted thereon. These gears mesh with other spiral gears 43 and 44 on counter shafts 45 and 46 respectively. There is a worm wheel gear 21 affixed to each of the counter shafts for driving each of the worm gears 22, which in turn are adapted to drive the supply and take-up reels respectively.

The arrows illustrated in Fig. 7 indicate the direction of rotation of the gears when the film is passing from the supply to the take-up reel. At such time the supply reel worm gear 22 will be urged axially by the coacting gear 21 to disengage the associated clutch, while the corresponding worm gear for the take-up reel will be urged axially in the opposite direction to engage the associated clutch. If the direction of motor-rotation should be reversed, or if a reversing mechanism should be incorporated in the connection between the motor and the shaft 40, then the worm gear for the supply reel will be urged axially in the opposite direction to engage the associated clutch, while that for the take-up reel will be automatically disengaged. Thus, when the motor is started, one clutch is automatically moved into engagement, and the other is automatically disengaged, and such automatic operation can be selectively controlled either by the direction in which the motor is rotated, or by the use of a reversing mechanism between the source of power and the worm gears.

The pivotal connector 27 between the inner and outer parts of the reel supporting arm permits the outer part of each arm to be swung inwardly when the reels are removed therefrom. The inward position is shown by the broken lines 26a in Fig. 1, and in such position, the overall dimensions are relatively small, wherefore the projector becomes a compact unit which can be placed in a container of convenient size. Furthermore, the upper arm provides a handle by means of which the projector can be lifted conviently out of the case.

An advantage of my invention is the fact that a positive drawing connection is made between the source of power and the reels without necessitating the use of connecting members such as belts, which are apt to wear quickly and to cause an uneven operation of the reels. A further advantage is the fact that one reel is automatically disengaged when the other is connected to the source of power, and that the speed of reel rotation is automatically adjusted to compensate for variations in the number of turns of film thereon.

I claim:

1. In a moving picture projector, the combination with a support of a reel supporting arm pivotally mounted thereon, an electric motor carried by the support, and reel operating mechanism extending through the arm, said mechanism having a disengageable connection associated therewith, and adjacent the pivotal connection of the arm with the support.

2. In a moving picture projector, the combination with a support, of a reel, a rotatable driving member mounted on the support, and mechanism extending through the support for providing an operable connection between the member and the reel, said support having a hinged joint, and said mechanism including a disengageable driving connection adjacent the hinge.

3. In a moving picture projector, the combination with a support, of a hollow arm extending therefrom, means for pivotally mounting the arm upon the support, an electric motor associated with the support, a reel associated with the arm, and mechanism extending through the arm for providing an operative connection between the motor and the reel, said mechanism having a separable connection, which is adapted to be brought into operative relationship when the arm is moved into operative position.

4. A motion picture projector, comprising the combination of a frame, a pair of hollow arms carried thereby, a supply reel shaft and a take-up reel shaft carried by the arms respectively, a drive shaft carried by the frame, mechanisms connected with the drive shaft and occupying the respective arms for driving the reel shafts, said mechanisms including clutches, and automatic means to uncouple one or the other clutch according to the direction of rotation of the driving shaft.

5. A motion picture projector, comprising the combination of a frame, a pair of hollow arms carried thereby, a pair of reel-supporting shafts carried by said arms respectively, a pair of aligning shafts within each hollow arm connected together by a separable clutch, the outer shaft being geared with the corresponding reel shaft and the inner shaft being so mounted that it may move longitudinally, and driving mechanism having a worm connection with the inner shaft.

6. In a motion picture projector, the combination of a pair of reel shafts, a drive shaft, a pair of spiral gears connected with the drive shaft so as to be driven thereby, a connection between each spiral gear and the corresponding reel shaft comprising an axially shiftable shaft having a spiral gear connection with the spiral gear mentioned and having a clutch, and an aligned shaft having a bevel gear connection with the reel shaft and having a clutch adapted to coact with the clutch first mentioned.

7. In a motion picture projector, the combination with a main frame, of a hollow supporting arm, one end of said arm being rigidly secured to the main frame, a reel rotatably mounted on the other end of the arm, said arm comprising two parts hinged together, whereby the outer portion of the arm may be swung into position adjacent the main frame for packing purposes, and reel operating mechanism extending through the arm, said mechanism having a disengageable connection associated therewith adjacent the hinge of the arm.

8. In a moving picture projector, the combination with a main frame, of hollow supporting arms, one end of each arm being rigidly secured to the main frame, a reel rotatably mounted on the other end of each arm, each arm comprising two parts pivotally connected together, a rotatable driving member within the main frame, and mechanism including a gear driven clutch, providing an operative connection between the member and each reel through the hollow supporting arms.

9. In a moving picture projector, the combination of a main frame, hollow supporting arms, one end of each arm being rigidly secured to the main frame, a reel rotatably mounted on the other end of each arm, each arm comprising two parts pivotally connected together, a rotatable driving member within the main frame, and mechanism including a gear driven clutch, providing through said hollow arms, an operative connection between the member and each reel, said clutch being adapted to be moved into engagement automatically when the gear is rotated in one direction and to be disengaged automatically when the gear is rotated in the opposite direction.

10. In a moving picture projector, the combination with a main frame, of a hollow supporting arm associated therewith, a reel rotatably mounted on the end of said arm, said arm comprising two parts pivotally connected together, whereby the outer portion of the arm may be swung into position adjacent the main frame for packing purposes, a rotatable driving member within the main frame, a shaft extending through the hollow arm for driving the reel, a clutch on said shaft adjacent the pivotal connection of the supporting arms, and means for driving said shaft from the rotatable driving member, said means including a worm on the shaft, said worm being adapted to move the shaft longitudinally to engage the clutch when driven in one direction, and to move the shaft longitudinally to disengage the clutch when driven in the opposite direction.

11. In a motion picture projector, the combination with a main frame, of a hollow supporting arm associated therewith, a reel rotatably mounted on the end of said arm, said arm being separable, a rotatable driving member within the main frame, a rotatable shaft within the hollow supporting arm, a driving connection between the shaft and the reel, said shaft being separable at a point adjacent the point of separation of said supporting arm, a clutch at the point of separation of said shaft, and a worm on said shaft adapted to be driven by said rotatable driving member, one part of the shaft being movable longitudinally to cause engagement of the clutch when the worm is driven in one direction, and movable longitudinally to cause disengagement of the clutch when the worm is driven in the opposite direction.

12. In a moving picture projector, the combination with a main frame, of a hollow supporting arm associated therewith, a reel rotatably mounted on the end of said arm, the arm comprising two parts pivotally connected together, whereby the outer portion of the arm may be swung parallel to the main frame for packing purposes, a shaft within one part of said hollow supporting arm for driving the reel, a shaft member journalled within the other part of said supporting arm, a clutch associated with the shaft and shaft member, said clutch being adjacent the pivoted connection, a worm on the shaft member and means for driving the same, said second shaft member being adapted to move longitudinally to cause the clutch to engage when the worm is turned in one direction, and to cause the clutch to disengage when the worm is turned in the opposite direction.

13. In a moving picture projector, the combination with a main frame, of a hollow supporting arm associated therewith, a reel rotatably mounted on the end of said arm, the arm comprising two parts pivotally connected together, a shaft journalled within one part of said hollow supporting arm, a friction coupling associated with the shaft and adapted to drive the reel, a shaft member journalled within the other part of said supporting arm, a clutch between the shaft and shaft member, said clutch being adjacent the pivoted connection, a worm on the shaft member and means for driving the same.

14. In a moving picture projector, the combination with a main frame, of a hollow supporting arm associated therewith, a reel rotatably mounted on the end of said arm, the arm comprising two parts pivotally connected together, whereby the outer portion of the arm may be swung closer to the main frame for packing purposes, a shaft journalled within one part of said hollow supporting arm, a friction coupling associated with one end of said shaft for driving the reel, a shaft member journalled within the other part of said supporting arm, a clutch between the shaft and shaft member, one face of said clutch being associated with the shaft and the other face of said clutch being associated with the shaft member, a worm on the shaft member and means for driving the same, said shaft member being adapted to move longitudinally to cause the clutch faces to engage when the worm is driven in one direction and to cause the clutch faces to disengage when the worm is driven in the opposite direction.

15. In a moving picture projector, the combination of a supply reel, a take-up reel, a rotatable driving member, a pair of supporting arms, and transmission mechanisms within the arms operatively connecting the driving member and the two reels, said mechanism including a pair of clutches and means for automatically separating one clutch for one direction of movement of the driving member and the other clutch for the other direction of movement of the driving member.

16. In a machine of the character described, the combination of a reel, a rotary shaft for driving the same, a second shaft geared to said reel shaft, a third shaft aligned with said second shaft, a separable clutch connecting the second and third shafts, a spiral gear rigid on one end and one clutch member on the other end of the third shaft, and a driving wheel meshing with the spiral gear, there being provision for axial movement of said third shaft sufficient to enable the clutch member thereon to engage and disengage with its mate.

17. In a reel driving mechanism, the combination of a hollow arm, a pair of aligned shafts carried therein, a separable clutch adapted to connect the two shafts, a helical gear on one of the shafts, a driving wheel meshing with the helical gear, there being provision for axial movement of the shaft carrying the helical gear sufficient to enable disengagement and reengagement of the clutch, and means driven by the other shaft.

18. In a device of the character described, the combination of a frame, an arm projecting therefrom, a reel driving shaft carried by the arm, driving mechanism for said shaft, including two aligned shafts carried by the arm lengthwise thereof, one of which is connected at its outer end to the reel shaft and at its inner end by a separable clutch to the other shaft, a worm on the latter shaft, and a worm wheel meshing with the worm, there being provision for sufficient longitudinal movement of the worm-carrying shaft to enable disengagement of the clutch.

19. In a device of the character described, the combination of a hinged supporting arm, a reel driving shaft carried thereby beyond the hinge, driving mechanism for said shaft, including two aligned shafts respectively on opposite sides of the hinge, one of which shafts is connected at one end to the reel shaft and at the other end by a separable clutch adjacent the hinge with the other shaft, a helical gear on the latter shaft, and a wheel meshing with the helical gear, there being provision for sufficient longitudinal movement of the shaft carrying the helical gear to enable disengagement of the clutch.

20. In a driving mechanism, the combination of a hollow arm comprising two aligned tubular sections hinged together, a pair of aligned shafts, bearings in the two sections carrying the two shafts respectively with the inner shaft axially shiftable and the outer shaft non-shiftable, a separable clutch adjacent the hinge adapted to connect the two shafts, a helical gear on the inner shaft, a driving wheel meshing with the helical gear, and means driven by the outer shaft.

21. In a moving picture projector, the combination of a supply reel, a take-up reel, a rotatable driving member, separable reel supporting arms, and a separable transmission mechanism within each arm, the regions of separation of each supporting arm and of the transmission mechanism within it being adjacent, whereby the rotatable driving member is automatically connected with the reels when the respective arms are in operating position, and is automatically disconnected from the reels when the respective arms are in inoperative position.

ERNEST S. CARPENTER.